April 18, 1967  E. R. ZIEGLER  3,314,195
CONCEALED WINDSHIELD WIPER MECHANISM
Filed May 10, 1965  5 Sheets-Sheet 1
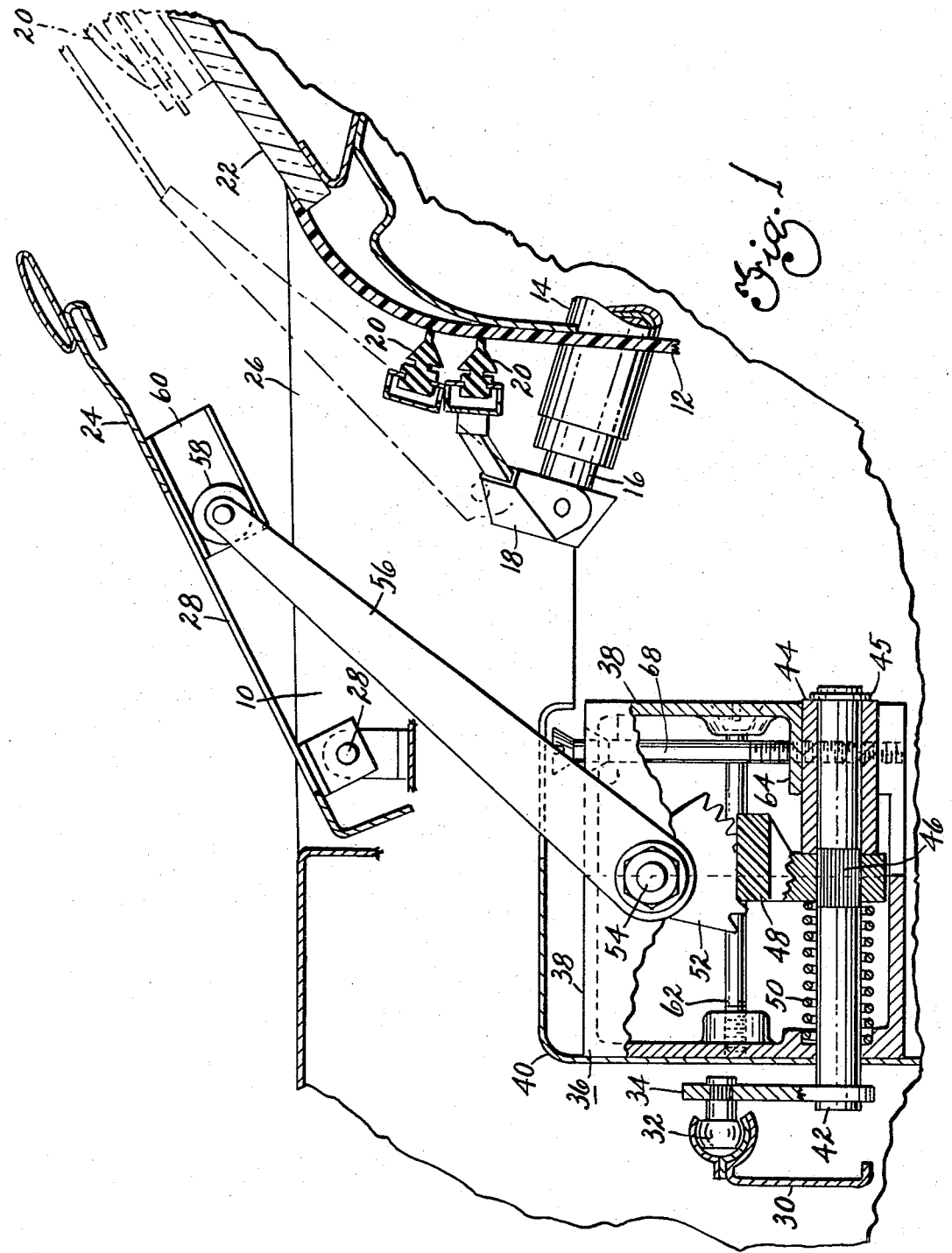
INVENTOR
EUGENE R. ZIEGLER
BY
*W. E. Finken*
ATTORNEY

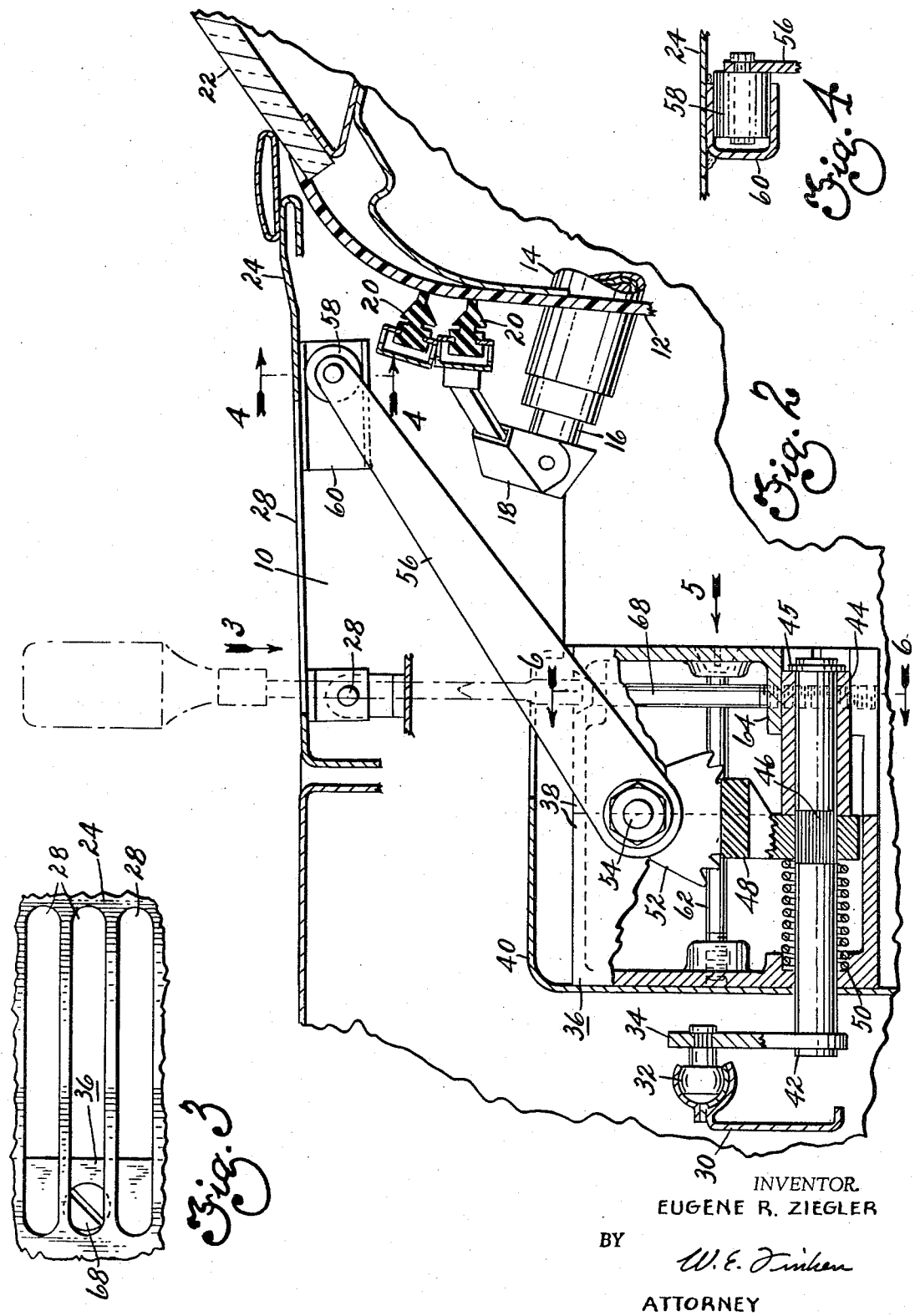

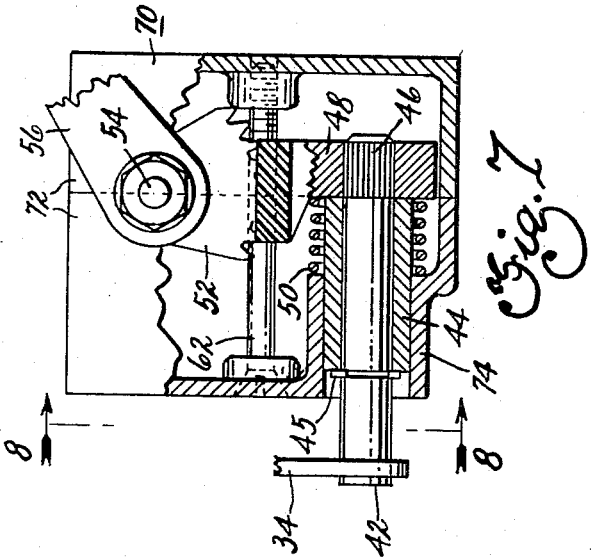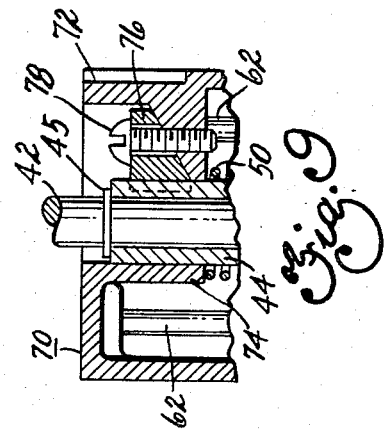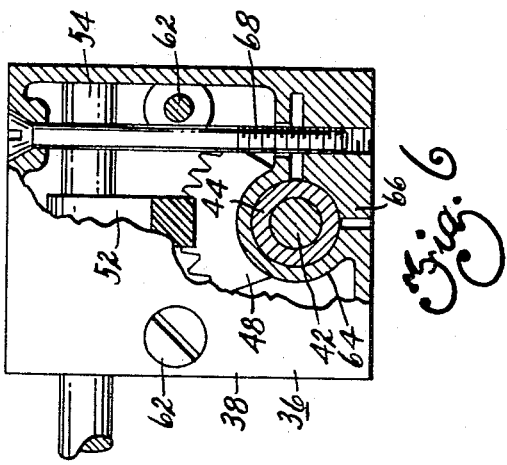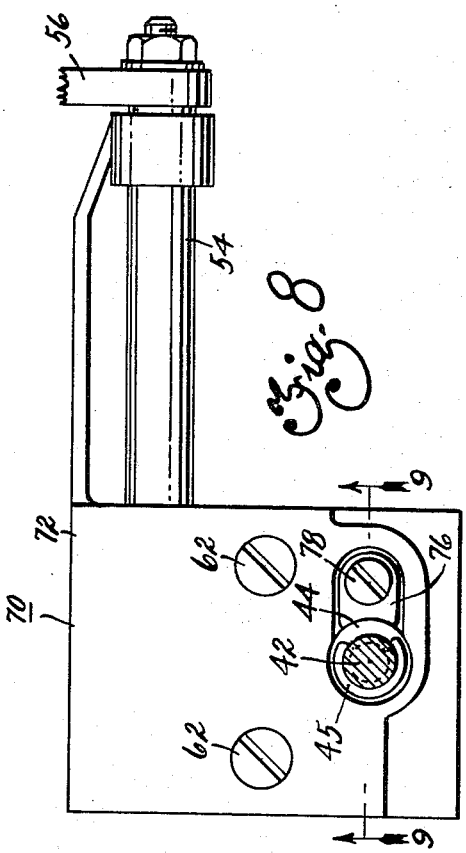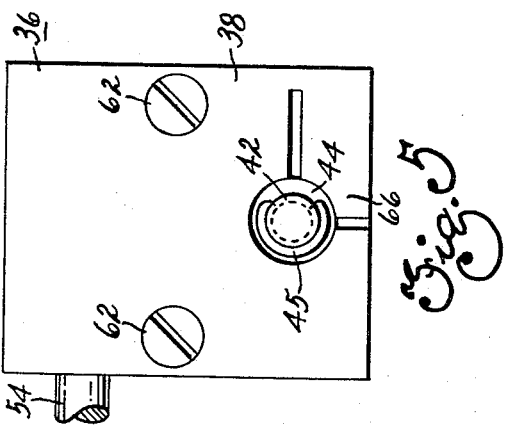

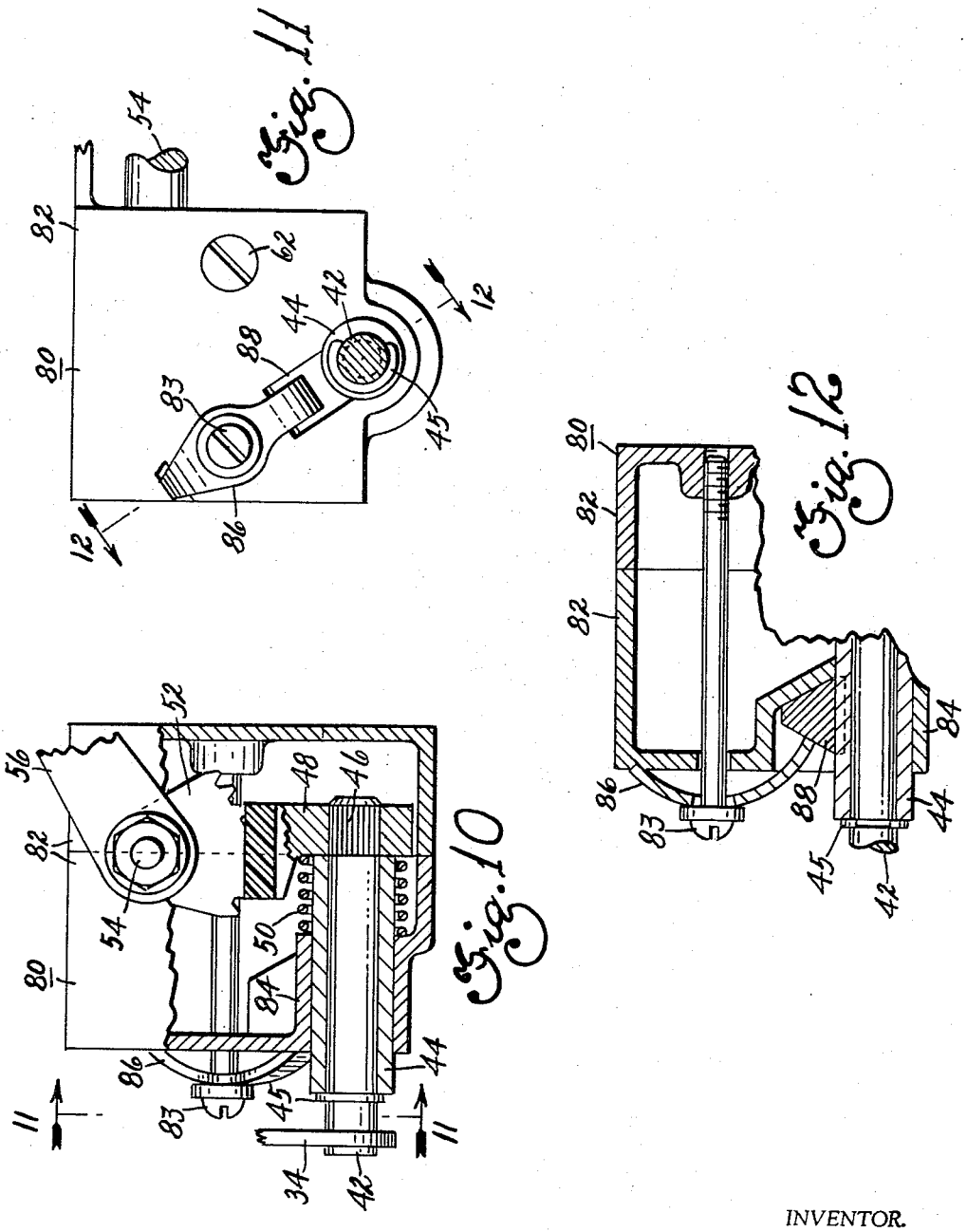

April 18, 1967 E. R. ZIEGLER 3,314,195
CONCEALED WINDSHIELD WIPER MECHANISM
Filed May 10, 1965 5 Sheets-Sheet 5
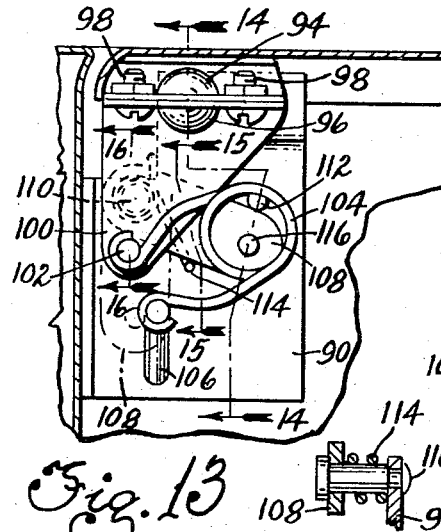
Fig. 13
Fig. 16
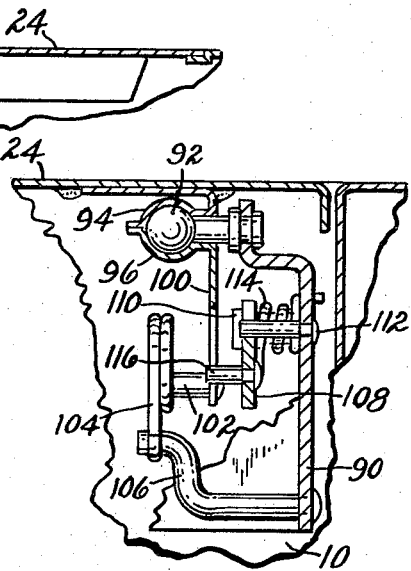
Fig. 15
Fig. 14
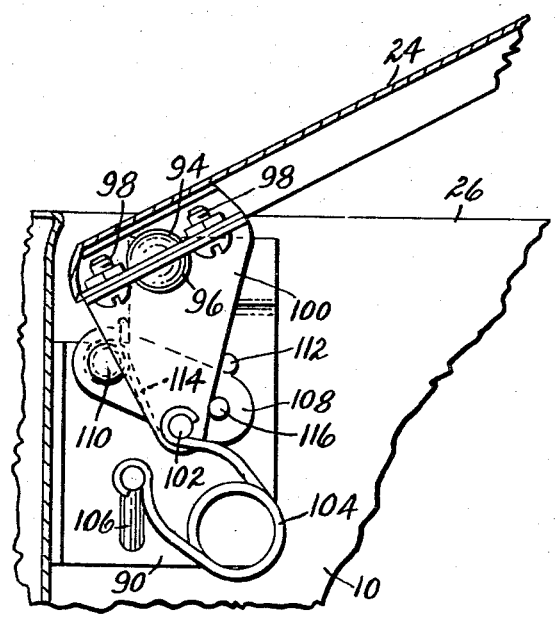
Fig. 17
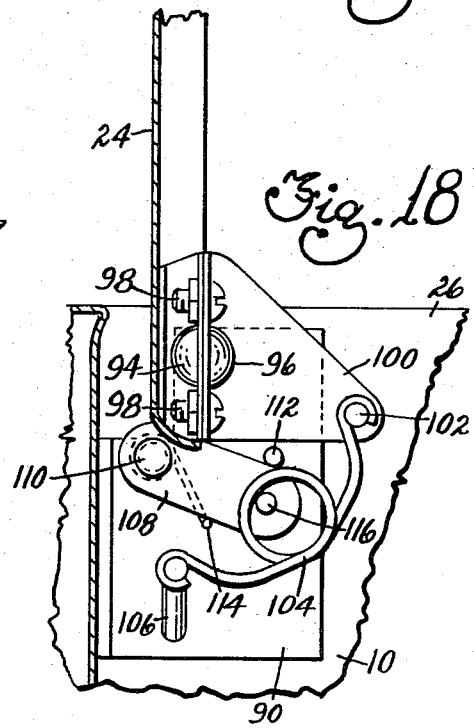
Fig. 18
INVENTOR.
EUGENE R. ZIEGLER
BY
W. E. Finken
ATTORNEY

United States Patent Office 3,314,195
Patented Apr. 18, 1967

3,314,195
CONCEALED WINDSHIELD WIPER MECHANISM
Eugene R. Ziegler, Spencerport, N.Y., assignor to General Motors Corporation, Detroit, Mich., a corporation of Delaware
Filed May 10, 1965, Ser. No. 454,570
9 Claims. (Cl. 49—342)

This invention pertains to windshield cleaning mechanism, and particularly to an improved structure for concealing vehicular windshield cleaning mechanism when it is not in use.

In copending application Ser. No. 428,109 filed Jan. 26, 1965 in the name of Paul S. Heiler, of common assignee, a concealed windshield wiper mechanism is disclosed wherein the windshield cleaner assemblies are disposed in a cowl well located forwardly of the windshield when not in use. The access opening of the well is closed by two cover parts which are positively driven by the wiper motor through an irreversible drive between open and closed positions as the cleaner assemblies are moved to and from their parked position. In assembling the concealed wiper mechanism on a vehicle it is necessary to have the covers open, and since the wiper mechanism is in its parked position the structure must be provided with means operable to disengage the covers from the actuating mechanism. After assembly, the covers are manually closed to adjust the cover actuating mechanism to compensate for body tolerances, after which it is locked in position. In addition, it is desirable to provide means permitting full opening movement of the covers to facilitate repair and/or replacement of the wiper arm and blade assemblies.

Accordingly, among my objects are the provision of cover actuating means for concealed wiper mechanism wherein the cover parts can be manually moved between open and closed positions independent of the actuating mechanism for assembly purposes, after which the actuating mechanism can be locked in the engaged position; the further provision of an adjustable gear box assembly for cover actuating mechanism of the aforesaid type including externally accessible locking means; and the still further provision of an improved hinge support for the cover parts which is manually adjustable to permit full manual opening of the cover parts to facilitate access to the well for repair or replacement of the windshield cleaner assemblies.

The aforementioned and other objects are accomplished in the present invention by embodying a manually adjustable helical gear arrangement in the gear box of the cover actuating mechanism together with means for locking the gear arrangement in the adjusted position when the cover parts are manually closed. In addition, the present invention comprehends the provision of manually adjustable stop members for limiting opening movement of the cover parts, which stop members can be manipulated to permit full cover opening for purposes of assembly or disassembly when the cover actuating mechanism is disengaged.

Further objects and advantages of the present invention will be apparent from the following description, reference being had to the accompanying drawings wherein several embodiments of the present invention are clearly shown, and wherein similar numerals depict similar parts throughout the several views.

In the drawings:

FIGURE 1 is a fragmentary view, partly in section and partly in elevation, of the concealed wiper mechanism constructed according to one embodiment of the present invention.

FIGURE 2 is a view similar to FIGURE 1 with the cover in the closed position.

FIGURE 3 is a fragmentary view, in elevation, taken in the direction of arrow 3 of FIGURE 2.

FIGURE 4 is a fragmentary, sectional view taken along line 4—4 of FIGURE 2.

FIGURE 5 is a side view in elevation taken in the direction of arrow 4 of FIGURE 2.

FIGURE 6 is a fragmentary view, partly in section and partly in elevation, taken along lines 6—6 of FIGURE 2.

FIGURE 7 is a fragmentary view, partly in section and partly in elevation, of a gear box assembly constructed according to the second embodiment of the present invention.

FIGURE 8 is a view, partly in section and partly in elevation, taken along line 8—8 of FIGURE 7.

FIGURE 9 is a fragmentary, sectional view taken along line 9—9 of FIGURE 8.

FIGURE 10 is a view, partly in section and partly in elevation, of the preferred embodiment of the gear box assembly constructed according to the present invention.

FIGURE 11 is a view, partly in section and partly in elevation, taken along the line 11—11 of FIGURE 10.

FIGURE 12 is a fragmentary, sectional view taken along line 12—12 of FIGURE 11.

FIGURE 13 is a fragmentary view, partly in section and partly in elevation of the preferred hinge structure for the cover parts.

FIGURE 14 is a fragmentary view taken along line 14—14 of FIGURE 13.

FIGURES 15 and 16 are fragmentary sectional views taken along lines 15—15 and 16—16 respectively of FIGURE 13.

FIGURE 17 is a fragmentary view, partly in section and partly in elevation, depicting the cover in the open position.

FIGURE 18 is a view similar to FIGURE 17 depicting the cover in the fully open position as permitted by the manually adjustable stop.

Referring to FIGURES 1 and 2, the windshield cleaning mechanism is disposed in a cowl well 10 when not in use, the cowl well being provided with a ramp 12 along its rear wall. In accordance with conventional practice, the windshield cleaning mechanism comprises a pair of spaced oscillatable wiper arm and blade assemblies, one of which is depicted in FIGURE 1. Each assembly comprises a transmission housing 14 attached to the rear wall of the well for rotatably supporting a pivot shaft 16 carrying a wiper arm 18. The wiper arm 18 may include spring hinge connected inner and outer sections, the inner section of which is detachably connected to the pivot shaft 16, and the outer section of which carries a wiper blade 20 that is oscillatable across the outer surface of a windshield 22. The spaced pivot shafts 16 may be actuated through an irreversible drive linkage, not shown, by an electric wiper motor, not shown, which includes a variable throw crank assembly for moving the wiper blades to and from their stowed positions within the well 10 to operating positions on the windshield 22. It is understood, of course, that the wiper blades and arms are movable throughout wiping strokes across the windshield in their operating positions.

In accordance with the disclosure in copending application Ser. No. 386,917, now Patent No. 3,226,756, filed in the name of Paul S. Heiler on Aug. 3, 1964, of common assignee, the variable throw crank assembly of the electric wiper motor is used to actuate a two-part cover 24 through an irreversible drive linkage for closing the access opening 26 into the well 10 when the windshield cleaning mechanism is not in use. Each cover part 24 is hinged at each edge as indicated by 28 for movement about a substantially horizontal axis, and in the embodiment shown in FIGURES 1 through 3 each cover part 24 is provided with louvered openings 28. The irreversible drive linkage for operating the covers includes a reciprocable link 30 connected through a ball and socket joint 32 to a crank arm 34 constituting a component of a gear box assembly 36. The gear box assembly 38 includes a two-part die cast housing 38 attached to the vehicle cowl structure 40. A first shaft 42 is journalled in the housing 38 and is connected exteriorly thereof to the crank arm 34. The shaft 42 is journalled in a sleeve bearing 44 which is axially adjustable within the two-part housing 38. A snap ring 45 secures the shaft 42 within the bushing 44. In addition, the shaft 42 is formed with a straight splined portion 46 which receives a 45° helical gear 48 such that the gear 48 is rigidly connected to the shaft 42.

As seen in FIGURE 1, the shaft 42 is encompassed by a compression spring 50 which is arranged between the housing 38 and the gear 48 so as to bias the gear 48 and the shaft 42 to the right. The 45° helical gear 48 meshes with a second 45° helical gear 52 attached to a shaft 54 disposed at right angles to the shaft 42. The shaft 54 is journalled within the two-part housing 38 by a suitable bearing means, not shown, and has a drive arm assembly 56 rigidly connected thereto. The drive arm assembly 56 supports a roller 58 for each cover part 24, which roller is disposed in a channelled guide, or track, 60 attached to each cover part. In this manner each roller 58 is effectively "caged" within the track 60 so as to positively control the opening and closing movement of its respective cover part 24.

Referring to FIGURES 5 and 6, it can be seen that the two housing parts 38 of the gear box assembly 36 are connected by a pair of screws 62. Moreover, the bushing 44 is normally loosely supported in a split sleeve 64 having a wedge part 66 which receives the threaded end of a screw 68. When the screw 68 is loosened, the bushing 44 is free to slide axially relative to the split sleeve 64, and when the screw 68 is tightened the wedge part 66 of the split sleeve clamps the bushing 44 to preclude further axial movement thereof.

Referring again to FIGURE 1 and FIGURE 2, with the roller 58 engaged with the track 60 and the cover 24 in the open position, and with the screw 68 loosened, the cover 24 can be manually closed. The spring 50 exerts a force on the gear 48 which through the gear 52 tends to maintain the cover 24 in its open position. However, since the shaft 42 is restrained against manual rotation by link 30 due to its irreversible drive connection with the crank assembly of the wiper motor, when the cover 24 is manually moved from the open position to the closed position, the 45° helical gear 52 will be rotated in the clockwise direction, and since the gear 48 cannot rotate it will move axially to the left in the manner of a rack from the position of FIGURE 1 to the position of FIGURE 2 thereby compressing the spring 50. The helical gears are automatically adjusted during manual closure of the covers to compensate for body tolerances. Thereafter, a tool such as a screw driver, indicated in phantom in FIGURE 2, can be inserted through a louver opening 28 in the cover for tightening the screw 68 to clamp the sleeve about the bushing 44 and preclude further axial movement of the shaft 42 and the bushing 44. In this manner, the cover actuating mechanism is automatically adjusted and locked so that the cover 24 will be closed when the wiper mechanism is in its parked position. Thus, rotation of the shaft 42 through the crank arm 34 by the link 30 in one direction will rotate the gear 48 to rotate the gear 52 and open the cover 24, and rotation of the shaft 42 in the opposite direction will operate to close the cover parts 24.

Referring to FIGURES 7 through 9, a modified gear box assembly 70 is disclosed comprising a two-part housing 72, which parts are interconnected by a pair of screws 62, one of the parts having a sleeve portion 74 for supporting a bushing 44. The shaft 42 is journalled in the bushing 44 and has the 45° helical gear 48 rigidly connected thereto. Moreover, compression spring 50 is confined between the sleeve 74 of the housing and the gear 48. The 45° helical gear 48 meshed with 45° helical gear 52 attached to the transversely extending shaft 54 to which the actuating arm assembly 56 is attached. In this embodiment, as seen particularly in FIGURES 8 and 9, one of the housing parts 72 supports a wedge 76 attached thereby by a screw 78, which wedge abuts the bushing 44. Moreover, as seen in FIGURE 8 the screw 78 is accessible from the front of the gear box assembly 70, and thus access may be gained through the vehicle firewall and cowl structure wherein the gear box assembly is attached thereto. As in the first embodiment, manual closing of the cover parts with the screw 78 loosened will cause axial movement of the gear 48 and the shaft 42 together with its bushing 44 since manual rotation of the shaft 42 is precluded by irreversible drive connection with the wiper motor assembly. When the cover parts are fully closed, the screw 78 can be tightened to engage the wedge 76 with the bushing 44 so as to prevent further axial movement of the shaft 42.

Referring to FIGURES 10 through 12, the preferred embodiment of the gear box assembly will be described. In the preferred embodiment the gear box assembly 80 again includes a two-part housing 82, which parts are interconnected by a screw 62 and a screw 83. As in the previous embodiments, the shaft 42 is journalled in a bushing 44 which is supported in a sleeve 84 of the housing parts. The helical gear 48 is attached to the shaft 42 and the bushing is circumscribed by a spring 50 which is confined between the sleeve 84 and the gear 48. The gear 48 meshes with the helical gear 52 attached to the shaft 54 which carries the actuating arm assembly 56. In this embodiment, the screw 83 engages an arcuate clamp 86 having one end seated against the housing 82 and the other end engaging a locking wedge 88 which abuts the bushing 44. As in the previous embodiments, manual closure of the cover will impart axial movement to the gear 48, the bushing 44 and the shaft 42 compressing the spring 50, and after the cover parts are closed, the screw 83 can be tightened so as to lock the bushing 44 against movement through the wedge 88.

Referring to FIGURES 13 through 18, the preferred hinge structure for each cover part 24 comprises a bracket 90 attached to the vehicle cowl structure along each edge of each cover part 24. Bracket 90 has a ball stud 92 attached thereto and extending laterally therefrom and constituting a hinge pin. The ball stud 92 is received in a two-part socket 94 and 96 interconnected by bolts 98, the socket part 94 being welded to the cover part 24. The socket part 96 includes a flanged stop portion 100 having a laterally extending pin 102 attached thereto. The pin 102 receives one end of an over-center toggle spring 104, the other end of which is attached to the pin 106 attached to the bracket 90. In addition, the hinge mechanism includes an adjustable stop lever 108 pivotally supported on a pin 110 attached to the bracket 90. The stop lever 108 is biased against a pin 112 attached to the bracket 90 by a torsion spring 114 which encircles the pin 110. In addition, the stop lever 108 carries a stop pin 116.

The toggle spring 104 exerts pressure to both maintain the cover part closed as well as tending to maintain the cover part open. When the end of the toggle spring 104 attached to the pin 102 is moved over the vertical center of the pin 106, the spring exerts a force tending to move the cover to the open position in FIGURE 17. Conversely, when the cover is moved so that the pin 102 is again moved over center of the pin 106 in the opposite direction, the toggle spring 104 exerts a closing force on the cover 24. In the open position, the flange 100 of the socket part 96 engages the stop pin 116 thereby limiting opening movement of the cover. However, if it is desired to open the cover to a 90° position as seen in FIGURE 18, such movement can be accomplished by first loosening the adjustment on the gear box assembly as hereinbefore described so as to permit axial movement of the shaft 42 to thus permit disengagement of the roller 58 from the track 60. Thereafter, the stop lever 108 can be manually pivoted around the pin 110 and around the end of the stop flange 100 so as to disengage the pin 116 from the flange 100, as shown in phantom in FIGURE 13, and thus permit the cover part 24 to be moved to the 90° open position shown in FIGURE 18. To reengage the cover stop mechanism, it is only necessary to again manually depress the stop lever 108 so as to reposition the flange 100 on the left-hand side of the stop pin 116 as shown in FIGURE 17. In this manner, full access can be gained to the well so as to facilitate assembly and disassembly or repair of any of the component parts of the windshield cleaning assembly.

While the embodiments of the present invention as herein disclosed constitute preferred forms, it is to be understood that other forms might be adopted.

What is claimed is as follows:

1. In a vehicle having a windshield and a forwardly extending cowl with a transversely extending well therein having an access opening, a cover hinged to said cowl for closing said access opening, a gear box housing attached to the vehicle, a first shaft journalled in said housing, a drive arm attached to said first shaft and operatively connected to said cover for moving it between open and closed positions in accordance with the direction of pivotal movement of said drive arm, a first helical gear attached to said first shaft, a bushing slidably supported in said housing transversely of said first shaft, a second shaft journalled in said bushing, a second helical gear attached to said second shaft and meshing with said first helical gear, an irreversible drive link connected to said second shaft for precluding manual rotation of said second shaft, spring means acting between said housing and said second helical gear for biasing said second helical gear, said second shaft and said bushing to move said cover to an open position through said first helical gear, said first shaft and said drive arm, and locking means engageable with said bushing for precluding axial movement thereof, the arrangement being such that the cover can be manually moved from the open position to the closed position so as to impart axial movement to said second helical gear, said second shaft and said bushing when the locking means are released.

2. In a vehicle having a windshield and a forwardly extending cowl with a transversely extending well therein having an access opening, a cover hinged to said cowl for closing the access opening, a gear box attached to the vehicle, a first shaft journalled in said housing, a cover operating drive arm attached to said first shaft, a first helical gear attached to said first shaft, a bushing slidably supported in said housing transversely of said first shaft, a second shaft journalled in said bushing, a second helical gear attached to said second shaft and meshing with said first helical gear, an irreversible drive link connected to said second shaft for precluding manual rotation of said second shaft, spring means acting between said housing and said second helical gear for biasing said drive arm and said cover to an open position, said cover being manually movable from the open position to the closed position while rotation of the second shaft is precluded so as to impart axial movement to said second shaft and said bushing through said helical gears, and locking means engageable with said bushing for precluding axial movement thereof to retain the helical gears in adjusted position.

3. The combination set forth in claim 2 wherein said housing includes a split sleeve for slidably supporting said bushing, and wherein said locking means comprise a screw threadedly engaging said split sleeve for clamping said split sleeve about said bushing to preclude axial movement thereof.

4. The combination set forth in claim 2 wherein said locking means comprises a wedge engageable with said bushing, and a threaded fastener engaging said housing and said wedge for clamping said bushing to preclude axial movement thereof.

5. The combination set forth in claim 2 wherein said locking means comprises a wedge engageable with said bushing, a clamp engageable with said wedge, and a threaded fastener secured to said housing and engaging said clamp for clamping said wedge against said bushing to preclude axial movement thereof.

6. In a vehicle having a windshield and a forwardly extending cowl with a transversely extending well therein having an access opening, a cover for closing the access opening, said cover being hinged to the cowl at each edge for movement about a substantially horizontal axis, each hinge comprising a bracket attached to said cowl, a hinge pin attached to said bracket upon which each cover edge is mounted a stop member attached to one edge of the cover, a stop lever pivotally attached to one bracket and having a pin engageable with the stop member for limiting opening movement of the cover, said stop lever being manually movable to disengage the pin from the stop member and permit full opening movement of said cover, a gear box housing attached to the vehicle, a first shaft journalled in said housing, a drive arm attached to said first shaft and operatively connected to said cover through caged roller means, a first helical gear attached to said first shaft, a bushing slidably supported in said housing transversely of said first shaft, a second shaft journalled in said bushing, a second helical gear attached to said second shaft and meshing with said first helical gear, an irreversible drive link connected to said second shaft for precluding manual rotation thereof, and releasable locking means engageable with said bushing for precluding axial movement thereof, the arrangement being such that the locking means can be released to permit axial movement of said second shaft, said second helical gear and said bushing to open said cover and disengage said caged roller means, said stop lever being manually adjustable to disengage the stop lever from the stop member to permit full manual opening movement of said cover for access to said well.

7. The combination set forth in claim 6 wherein said hinge pin comprises a ball stud.

8. An adjustable gear box assembly for operating the hinged cover of a concealed windshield wiper mechanism including, a housing, a first shaft journalled in said housing, a first helical gear attached to said first shaft, a drive arm attached to said first shaft for operating said cover, a bushing slidably mounted on an axis transverse to the axis of said first shaft, a second shaft journalled in said bushing, a second helical gear attached to said second shaft and engaging said first helical gear, an irreversible drive link connected to said second shaft for precluding manual rotation of said second shaft, and locking means engageable with said bushing for precluding axial movement of said bushing, said second shaft and said second helical gear, said drive arm, said first shaft and said first helical gear being manually rotatable to shift the second helical gear, the second shaft and the bushing axially to an adjusted position when the locking means are released, which adjusted position will be maintained upon engagement of said locking means.

9. An adjustable gear box assembly for operating a hinged cover of a concealed windshield wiper mechanism including, a housing, a first shaft journalled in said housing, a first helical gear attached to said first shaft, a drive arm attached to said first shaft for operating the cover, a bushing slidably mounted in said housing on an axis transverse to the axis of said first shaft, a second shaft journalled in said bushing, a second helical gear attached to said second shaft and meshing with said first helical gear, an irreversible drive link connected to said first shaft for precluding manual rotation thereof, spring means acting between said housing and said second gear for biasing said second helical gear, said bushing and said second shaft in one direction, said second helical gear, said second shaft and said bushing being manually axially in the op- the opposite direction upon manual rotation of said drive arm, said first shaft and said first helical gear, and locking means in said housing engageable with said bushing for precluding axial movement of said bushing, said second shaft and said second helical gear after adjustment thereof.

References Cited by the Examiner
UNITED STATES PATENTS
2,895,157   7/1959   Kocourek _____ 15—250.16 X HARRISON R. MOSELEY, *Primary Examiner.*

REINALDO P. MACHADO, *Examiner.*

J. K. BELL, *Assistant Examiner.*

UNITED STATES PATENT OFFICE
CERTIFICATE OF CORRECTION

Patent No. 3,314,195                                April 18, 1967

Eugene R. Ziegler

It is hereby certified that error appears in the above numbered patent requiring correction and that the said Letters Patent should read as corrected below.

Column 7, line 3, after "manually" insert -- movable --.

Signed and sealed this 14th day of November 1967.

(SEAL)
Attest:

Edward M. Fletcher, Jr.                            EDWARD J. BRENNER
Attesting Officer                                       Commissioner of Patents